United States Patent [19]

Inoue et al.

[11] Patent Number: 5,045,962
[45] Date of Patent: Sep. 3, 1991

[54] MAGNETIC TAPE CLEANER

[75] Inventors: Yoshihisa Inoue, Hannou; Shinichi Ishizuka, Higashikurume, both of Japan

[73] Assignee: Nakamichi Corporation, Kodaira, Japan

[21] Appl. No.: 429,838

[22] Filed: Oct. 31, 1989

[30] Foreign Application Priority Data

Oct. 31, 1988 [JP] Japan .............................. 63-142451[U]
May 22, 1989 [JP] Japan ................................ 1-58832[U]

[51] Int. Cl.⁵ ................................................ G11B 3/58
[52] U.S. Cl. ...................................... 360/128; 360/137
[58] Field of Search ........ 360/137, 128, 132, DIG. 13, 360/100

[56] References Cited

U.S. PATENT DOCUMENTS 3,091,794  6/1963  Pillsbury, Jr. ...................... 360/128
3,701,178  10/1972  Kuntz ........................ 15/DIG. 13 X
4,858,265  8/1989  Suzuki et al. .......................... 15/100
4,947,270  8/1990  Paynter, III ............. 15/DIG. 13 X Primary Examiner—David J. Severin
Attorney, Agent, or Firm—Pearne, Gordon, McCoy & Granger

[57] ABSTRACT

A magnetic tape cleaner comprising a tape scraper engaging a recording face of a magnetic tape to scrape magnetic powder out of the recording face thereof and a magnet to attract and adhere thereto the magnetic powder scraped out of the recording face of the magnetic tape.

8 Claims, 11 Drawing Sheets

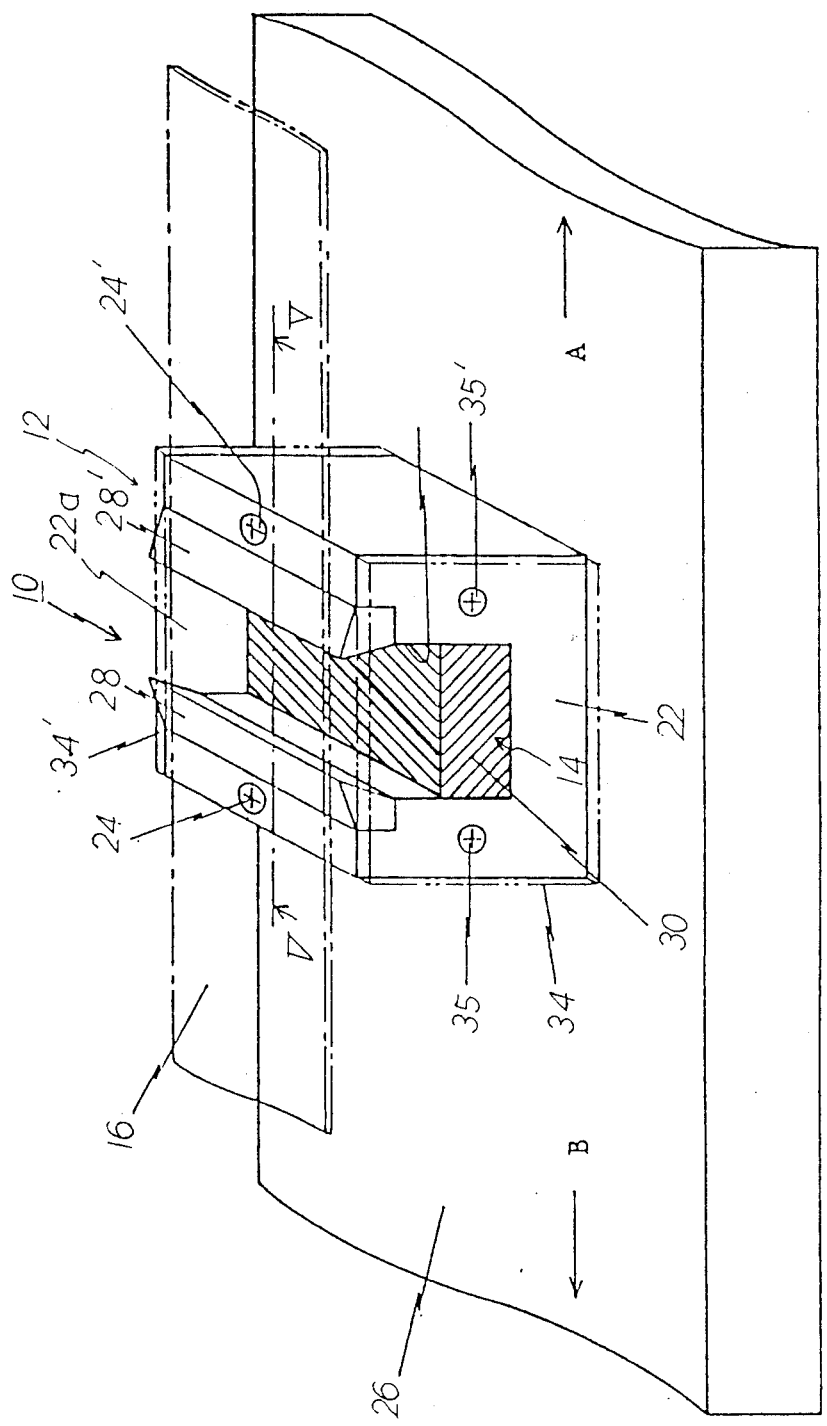

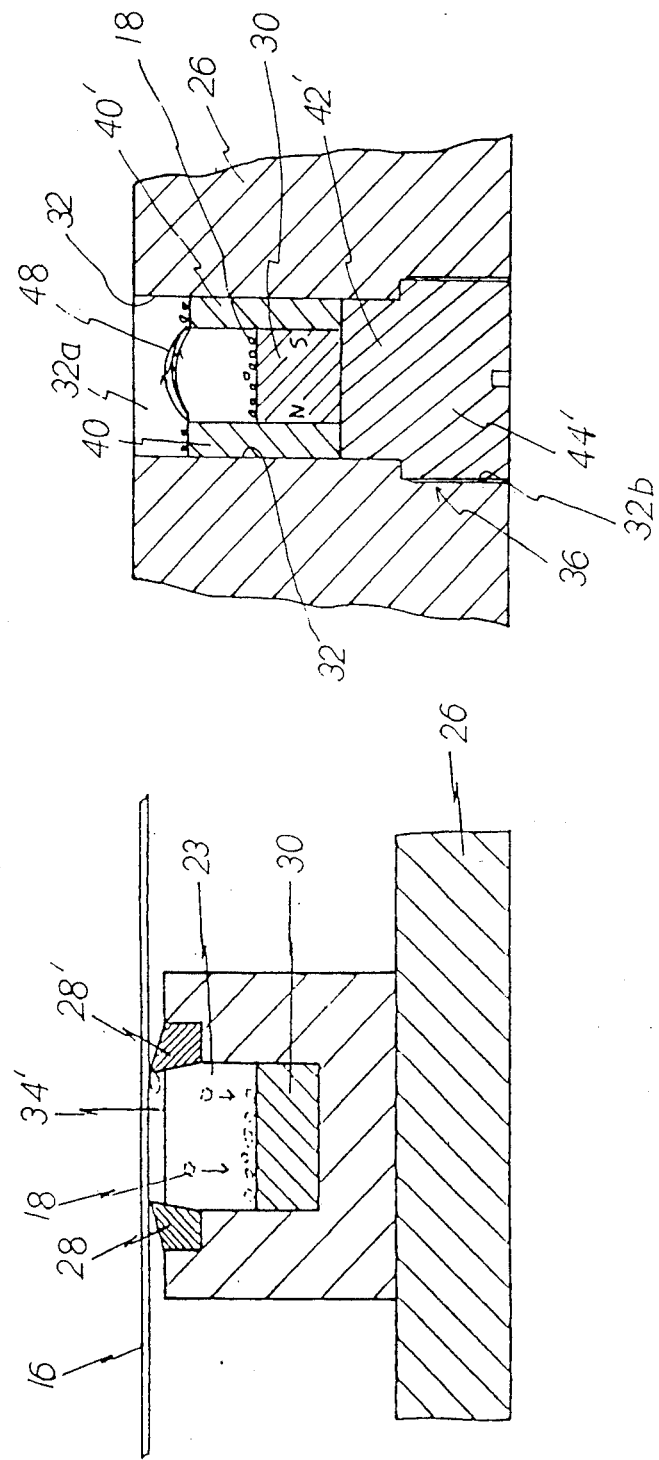

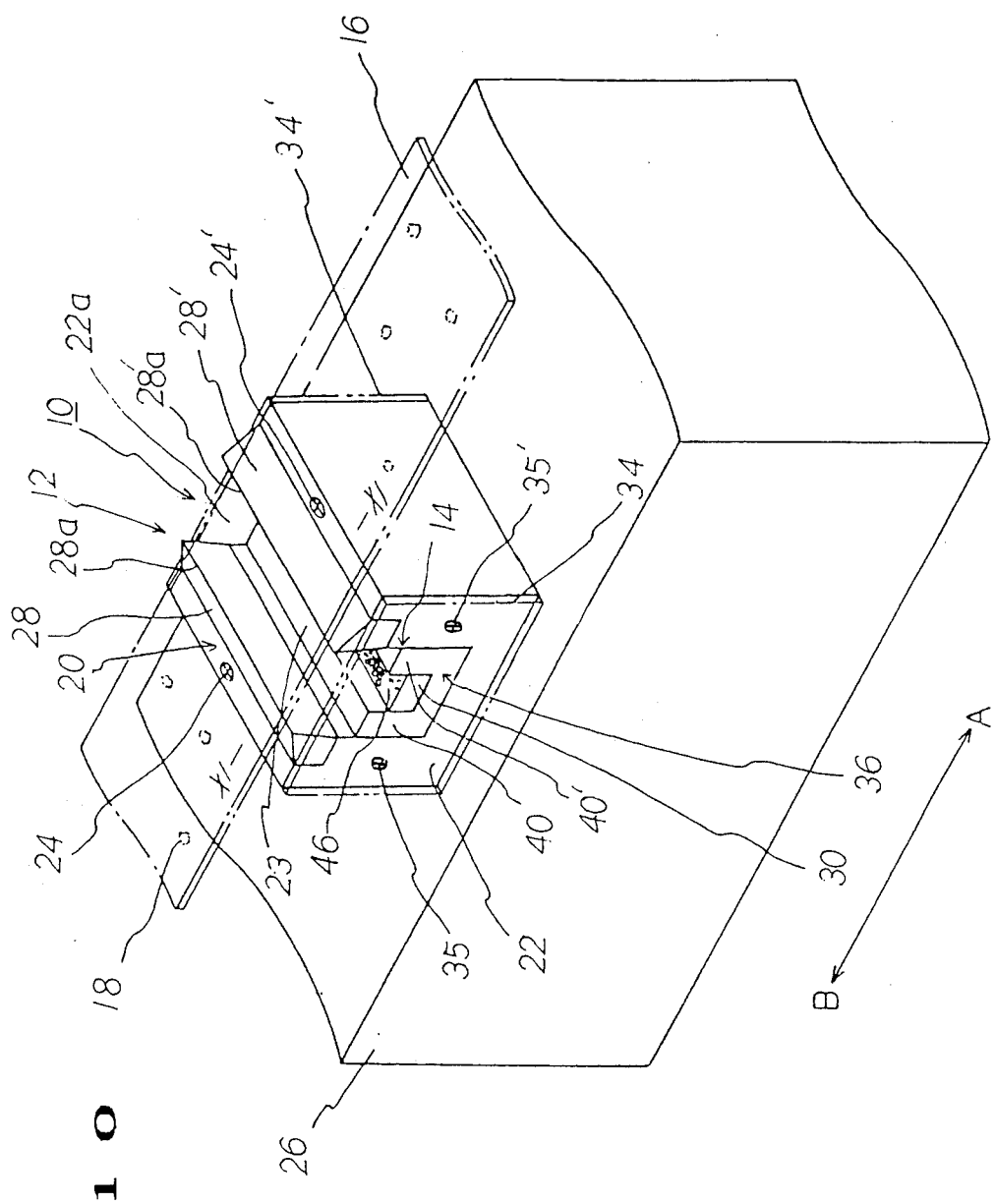

MAGNETIC TAPE CLEANER

BACKGROUND OF THE INVENTION

In general, in a magnetic recording and reproducing apparatus using a magnetic tape, the magnetic tape has magnetic powder coated on a recording face thereof tending to be stripped out thereof due to friction of the magnetic tape with a magnetic head on recording and reproducing. The magnetic powder stripped in this manner prevents the good recording and reproducing of the apparatus because the magnetic powder is transferred to a gap of the magnetic head while the magnetic tape having the stripped magnetic powder attached to the recording face is running.

Thus, there has been proposed magnetic tape cleaners for removing the stripped magnetic powder on the recording face of the magnetic tape.

One of the conventional magnetic tape cleaners is illustrated in FIG. 14. The magnetic tape cleaner comprises a tape scraper 1 securely mounted by screws 2 and 2' on a base 3 having a magnetic head, not shown, provided thereon. The tape scraper 1 comprises a C-shaped scraper body 4 having a width larger than a width of a magnetic tape 9 and disposed so that an opening 4a faces a tape running path. Scraper blades 5 and 5' for scraping magnetic powder 6 out of the recording face of the magnetic tape 9 are secured to recesses 4b and 4c of side walls of the scraper body 4. The conventional tape cleaner comprises suction means 7 such as a vacuum pump which is connected to the space within the scraper body 4 through a hose 8 which extends through the rear wall of the scraper body 4.

In the conventional magnetic tape cleaner, while the magnetic tape 9 is running in a direction indicated by an arrow A of FIG. 14, the magnetic powder 6 on the recording face of the magnetic tape 9 is scraped by the scraper blade 5' positioned on a downstream side of the tape running path and is floating within the space of the scraper body 4. The suction means 7 attracts the floating magnetic powder through an inlet 8a of the hose 8. While the magnetic tape 9 is running in a direction indicated by an arrow B of FIG. 14, after the scraper blade 5 on the downstream side of the tape running path scrapes the magnetic powder 6 out of the recording face of the magnetic tape 9, it is sucked by the suction means 7 in a similar manner.

Such a conventional magnetic tape cleaner is provided with the suction means 7, such as a vacuum pump, for sucking the magnetic powder scraped by the tape scraper 1 and, therefore, the scraped magnetic powder is prevented from being again attached to the recording face of the magnetic tape 9. However, since the suction means 7 is required in order to remove the magnetic powder 6 out of the scraper, the magnetic instrument having such a magnetic tape cleaner provided therein is disadvantageously large-sized. In addition thereto, the instrument is expensive to manufacture because the suction means is costly.

SUMMARY OF THE INVENTION

Accordingly, it is a principal object of the invention to provide a magnetic tape cleaner adapted to be compact.

It is another object of the invention to provide a magnetic tape cleaner adapted to be inexpensively manufactured.

In accordance with the present invention, there is provided a magnetic tape cleaner comprising:

tape scraper means engaging a magnetic tape to scrape magnetic powder from a recording face of said magnetic tape;

and magnet means disposed relatively below said tape scraper in a direction in which said scraped powder falls to attract said scraped magnetic powder and cause said powder to adhere thereto.

The magnet means may consist only of a magnet, or may be of a combination of a magnet and a yoke member connected to the magnet and including a pair of pole pieces having a gap provided therebetween.

According to the magnetic tape cleaner of the invention, it is compact and inexpensively manufactured because no suction means of large size and of high cost is required.

BRIEF DESCRIPTION OF THE DRAWINGS

The above and other objects and features of the invention will be apparent from the description of the embodiments of the invention with reference to the accompanying drawings in which;

FIG. 4 is a perspective view of a magnetic tape cleaner constructed in accordance with a modification of the magnetic tape cleaner of FIGS. 1 through 3;

FIG. 5 is a cross-sectional view of the magnetic tape cleaner taken along a line V—V of FIG. 4;

FIG. 9 is a cross-sectional view of a magnetic tape cleaner substantially similar to that of FIG. 6, but having a yoke member modified;

FIG. 10 is a perspective view of a magnetic tape cleaner constructed in accordance with a modification of the magnetic tape cleaner of FIGS. 6 through 8;

DESCRIPTION OF THE PREFERRED EMBODIMENTS

Figure 1:
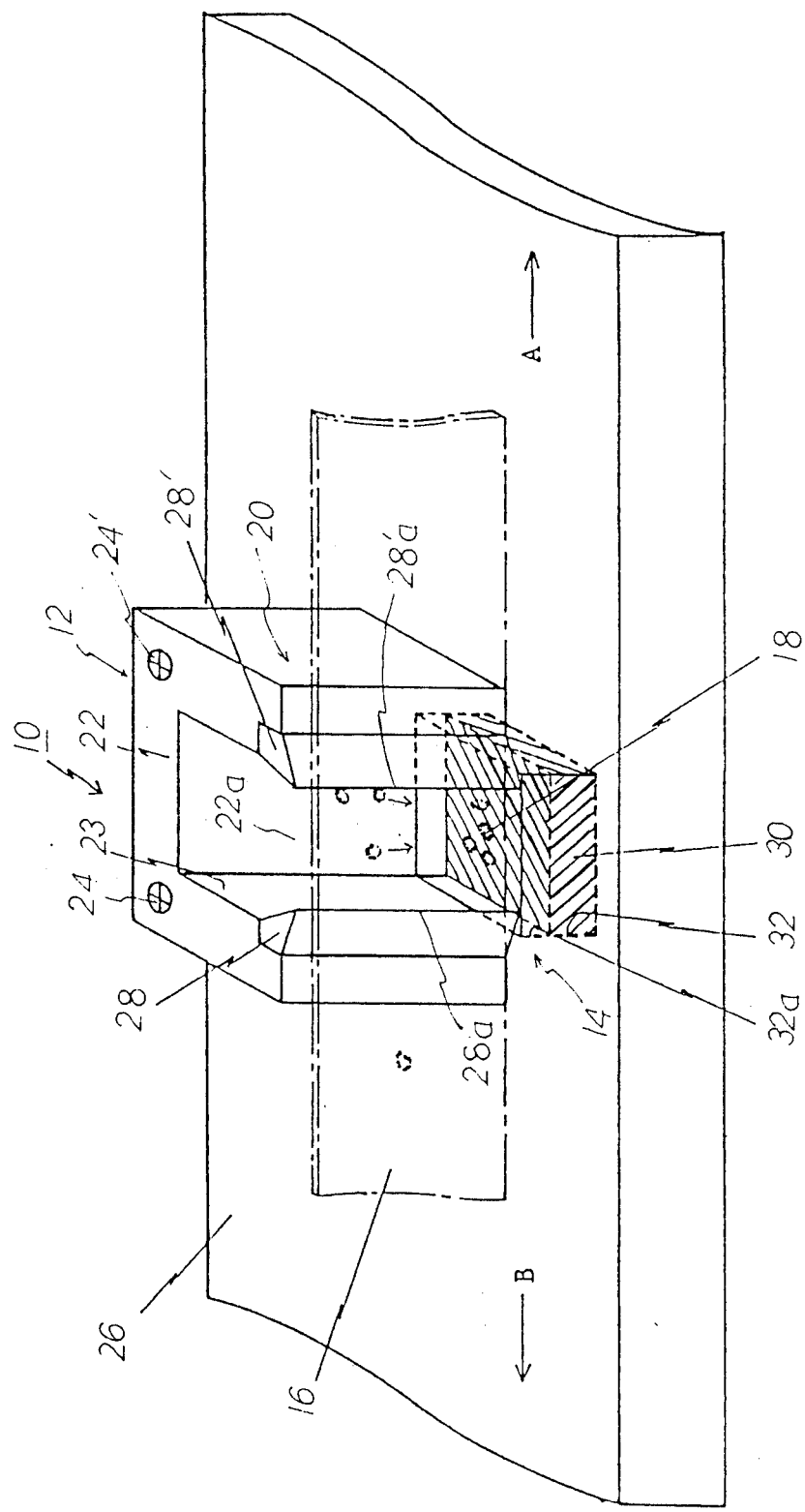
FIG. 1 is a perspective view of a magnetic tape cleaner constructed in accordance with one embodiment of the invention.
Figure 3:
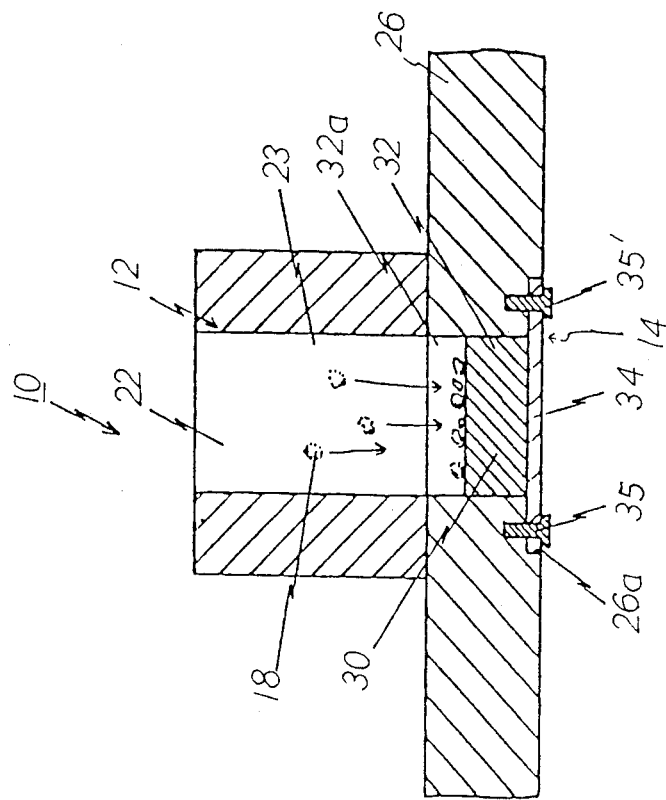
FIG. 3 is a cross-sectional view of the magnetic tape cleaner taken along a line III—III of FIG. 2.
Figure 2:
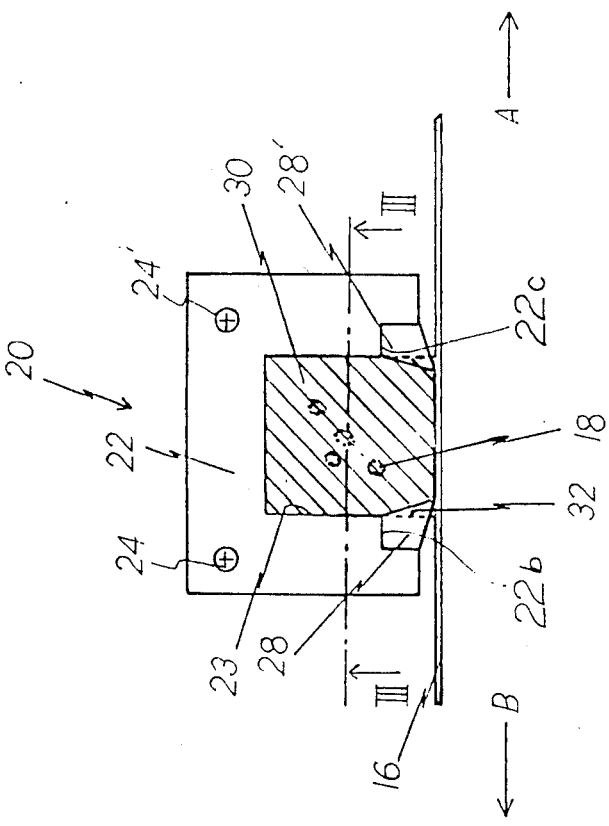
FIG. 2 is a plan view of the magnetic tape cleaner of FIG. 1.

Referring now to FIGS. 1 through 3, there is illustrated a magnetic tape cleaner constructed in accordance with one embodiment of the invention so that it is suitably used for a horizontal type magnetic instrument such as magnetic recording and reproducing apparatus. The magnetic tape cleaner 10 comprises tape scraper means 12 engaging a magnetic tape 16 to scrape loose magnetic powder 18 off a recording face of the magnetic tape 16 and magnet means 14 to attract and adhere thereto the scraped magnetic powder 18.

The tape scraper means 12 comprises a tape scraper 20 substantially identical to that of the conventional magnetic tape cleaner and including a C-shaped scraper body 22 of nonmagnetic material such as plastics having an opening 22a provided and securely mounted by screws 24 and 24' on a base or chassis 26 having a magnetic head, not shown, provided and a pair of scraper blades 28 and 28' securely mounted on the scraper body 22 at its recessed edges 22b and 22c thereof, respectively, and having edges 28a and 28'a to scrape the magnetic powder 18 from the recording face of the magnetic tape 16. As noted from FIG. 1, the scraper body 22 is positioned so that the opening 22a faces toward a front face of the magnetic instrument. The magnetic tape 16 has its running path along which it moves while it engages the tape scraper 20.

The magnet means 14 comprises a magnet 30 positioned within a containing hole 32 provided in the base 26 in alignment with a space 23 of the scraper body 22. The space 23 of the scraper body 22 is defined by the walls of the scraper body 22 and the portion of the magnetic tape 16 engaging the scraper blades 28 and 28'. The upper face of the magnet 30 is located at a position lower than the upper face of the base 26, as shown in FIG. 3, so as to form a recess 32a in the containing hole 32. The magnet 30 is held in the containing hole 32 by a cover 34 which is detachably mounted on the base 26 at its recess 26a on the bottom thereof. The cover 34 is securely mounted on the base 26 by screws 35 and 35'. Thus, it will be noted that the magnet 30 can be withdrawn out of the containing hole 32 by removing the cover 34. It is clear that the magnet 30 should be disposed at a position where it has no adverse effect on recorded information on the magnetic tape 16 in practice. Thus, the magnet 30 should be disposed at a position where it is far enough away from the magnetic tape 16 so that the intensity of the magnetic field provided by the magnet 30 on the recording face of the magnetic tape 16 is sufficiently low so as to have no adverse effect on the coercive force of the magnetic tape 16. As described later, the magnet 30 may be preferably disposed just below a position where the magnetic powder 18 floating within the space 23 after it is scraped by the scraping blades 28 and 28' falls by its gravity, in a direction in which it falls.

In operation, while the magnetic tape 16 is running in a direction of A of FIGS. 1 and 2, the magnetic powder 18 on the recording face of the magnetic tape 16 is scraped by the edge 28'a of the scraper blade 28' positioned on a downstream side of the tape running path and is floating within the space 23 of the scraper body 22. The magnetic powder 18 floating in this manner is magnetically attracted by the magnet 30 of the magnet means, and adheres to the upper face of the magnet 30, 14 so that it is collected within the recess 32a of the containing hole 32, preventing the magnetic powder from being again adhered to the magnetic tape 16 or otherwise scattered within the magnetic recording and reproduction device due to its movement. After much magnetic powder is collected within the recess 32a in a manner attracted by the magnet 30, it can be removed from the magnet 30 by withdrawing the magnet from the base 26 by detaching the cover 34.

FIGS. 4 and 5 show a magnetic tape cleaner 10 constructed in accordance with a modification of the magnetic tape cleaner of FIGS. 1 through 3 so that it is suitably used for a vertical type magnetic instrument. The same numerals designate the same components. In the magnetic tape cleaner 10 of FIGS. 4 and 5, the scraper body 22 is mounted on the base 26 so that the opening 22a faces upwardly and is secured by the screws 24 and 24' thereto. The magnet 30 is positioned within the space 23 of the scraper body 22 and held by front and rear covers 34 and 34' indicated by two dot-dash lines in FIG. 4 and detachably secured to the scraper body 22 by the screws 35 and screws 35'. Thus, it will be noted that the magnet 30 can be withdrawn by detaching the cover 34 or 34' from the scraper body 22. The magnet 30 is thinner than the depth of the space 23 of the scraper body 22, as shown in FIGS. 4 and 5. The space 23 of the scraper body 22 is defined by the side walls of the scraper body 22, the portion of the magnetic tape 16 engaging the scraper blades 28 and 28' and the magnet 30. The magnetic powder 18 on the recording face of the magnetic tape 16 is scraped by either of the scraper blades 28 and 28' in accordance with the tape running direction and the loose powder attracted and adhere to the upper face of the magnet 30. The magnetic powder 18 can be removed from the magnet 30 by detaching the cover 34 or 34' as aforementioned.

Figure 6:
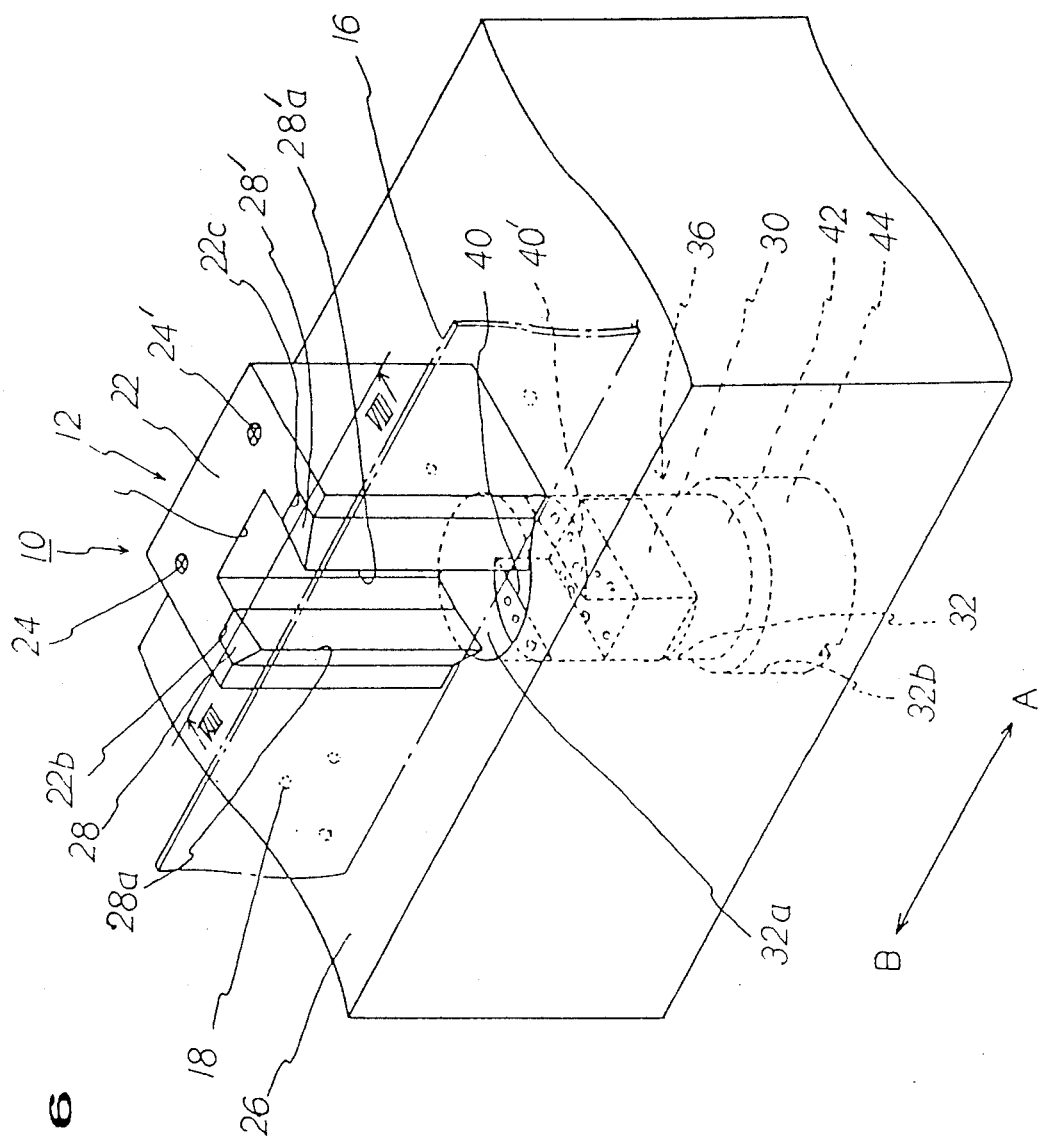
FIG. 6 is a perspective view of a magnetic tape cleaner constructed in accordance with another embodiment of the invention.
Figure 7:
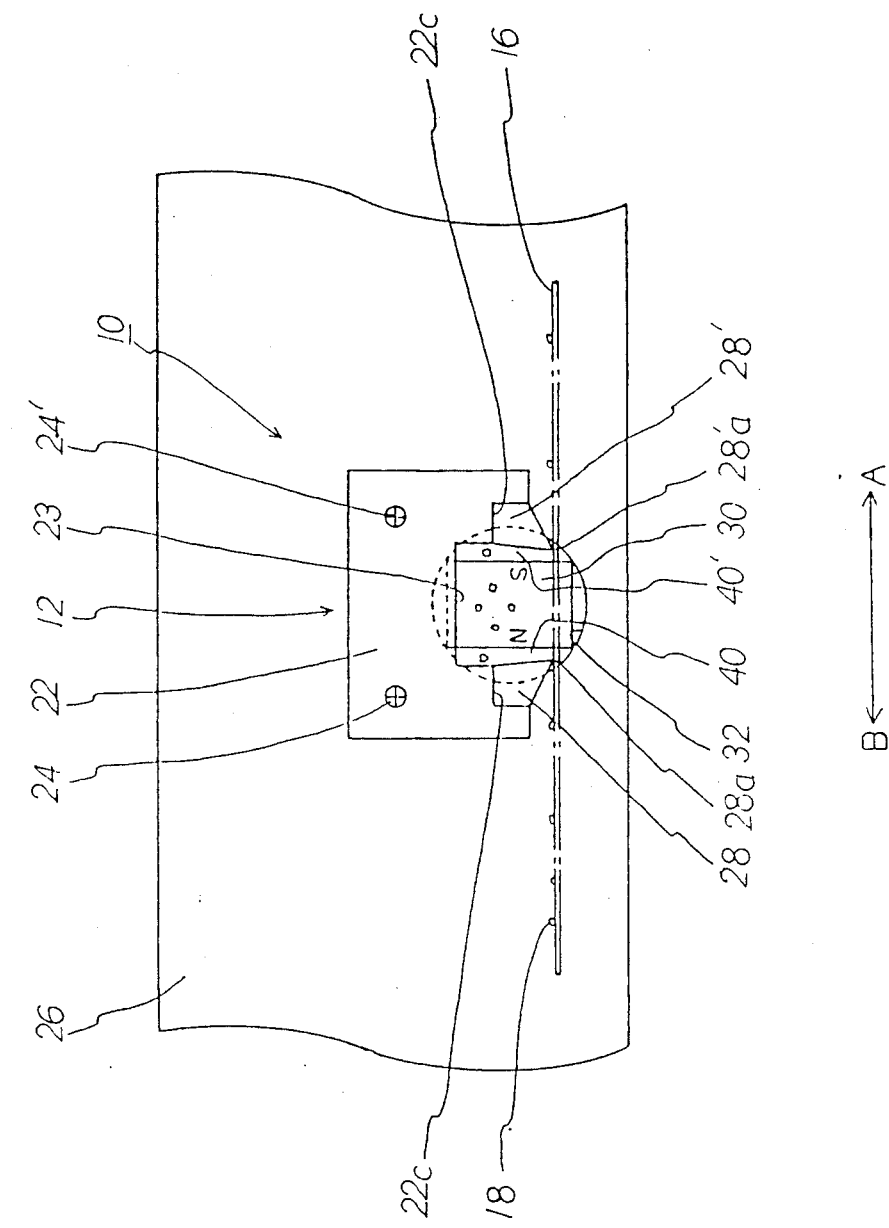
FIG. 7 is a plan view of the magnetic tape cleaner of FIG. 6.
Figure 8:
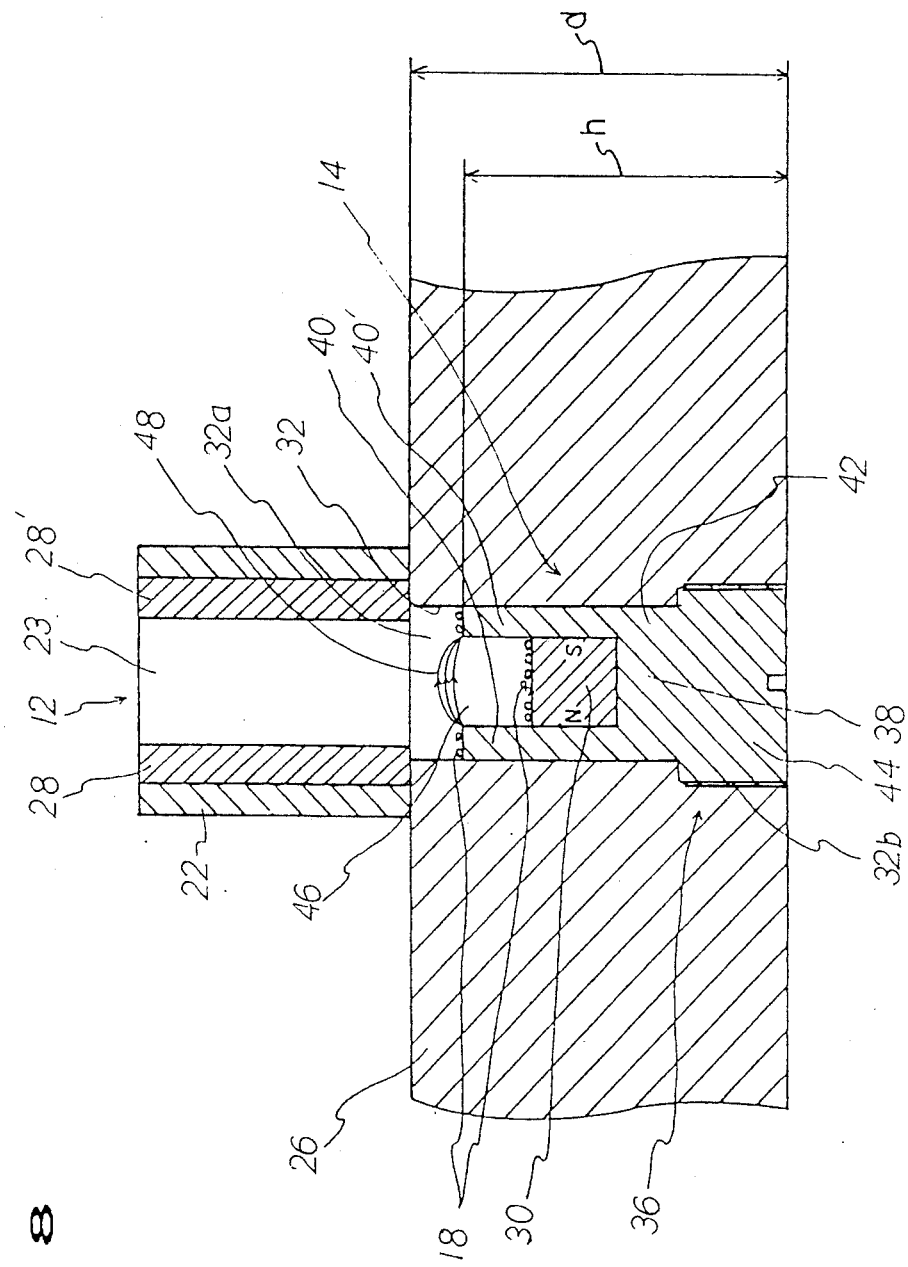
FIG. 8 is a cross-sectional view of the magnetic tape cleaner taken along a line VIII—VIII of FIG. 6.

FIGS. 6 through 8 show a magnetic tape cleaner 10 constructed in accordance with another embodiment so that it is suitably used for a horizontal type magnetic instrument. The same numerals designate the same components. The tape scraper means 12 of FIGS. 6 through 8 is substantially identical to that of FIGS. 1 through 3. The magnet means 14 of FIGS. 6 through 8 comprises a yoke member 36 as well as the magnet 30. The yoke member 36 comprises a yoke body 38 of magnetic material such as soft iron having a pair of pole pieces 40 and 40' and a connecting portion 42 physically and magnetically connecting the pole pieces 40 and 40' and a mounting portion 44 in the form of a screw which spirally engages the tapped enlarged hole portion 32b of the containing hole 32. The magnet 30 is positioned in the yoke body 38 so that it is positioned between the pole pieces 40 and 40' with its poles facing thereto. In the illustrated embodiment, the yoke body 38 and the mounting portion 44 may be formed integrally with each other. It will be understood that the yoke member 36 together with the magnet 30 can be withdrawn from the base 26 by disengaging the mounting portion 44 from the containing hole 32 at its enlarged hole portion 32b. As noted from FIG. 8, the yoke member 36 has a height h less than a thickness d of the base 26 so that the upper space 32a of the containing hole 32 is formed communicating with the space 23 of the scraper body 22. A magnetic gap 46 is formed between the pair of pole pieces 40 and 40' within the upper space 32a of the containing hole 32 so that magnetic flux 48 from the magnet 30 passes through the magnetic gap 46. It should be noted that the attracting or adhering force is concentrated at the magnetic gap 46.

In operation, while the magnetic tape 16 is running in a direction A of FIGS. 6 and 7, the magnetic powder 18 on the recording face of the magnetic tape 16 is scraped by the edge 28'a of the scraper blade 28' positioned on a downstream side of the tape running path and is floating within the space 23 of the scraper body 22. The magnetic powder 18 floating in this manner is magnetically attracted by and adheres to the upper face of the magnet 30 and the pole pieces 40 and 40' of the yoke member 36 so that it is collected within the upper space 32a of the containing hole 32. After much magnetic powder is collected within the upper space 32a while it is attracted by the magnet 30 and the pole pieces 40 and 40', it can be removed from the magnet 30 and the pole pieces 40 and 40' withdrawn from the base 26 by detaching the yoke member 36 from the base 26. As aforementioned, the yoke member 36 serves to attract the magnetic powder 18 by high magnetic force because the magnetic flux 48 is collected at the magnetic gap 46 between the pole pieces 40 and 40'. This means that even the magnet 30 of smaller size having lower magnetic force can sufficiently attract the magnetic powder 18 floating within the space 23 of the scraper body 22. It should be noted that since the magnetic flux 48 is collected at the magnetic gap 46 between the pole pieces 40 and 40', the leakage magnetic flux decreases. This advantageously prevents the magnet 30 from adversely affecting the magnetic tape 16.

FIG. 9 shows the magnetic tape cleaner 10 substantially identical to that of FIGS. 6 through 8 except for the yoke member 36 being modified. The modified yoke member 36 has no connecting portion 42 of magnetic material, but has a connecting portion 42' of material having low permeability. The pair of pole pieces 40 and 40' are physically connected by the connecting portion 42'. The mounting portion 44' is formed of nonmagnetic material. This is more advantageous because magnetic flux passing through the connecting portion 42' decreases and the density of magnetic flux increases at the magnetic gap 46, which causes a higher attracting and adhering force to be obtained.

Figure 11:
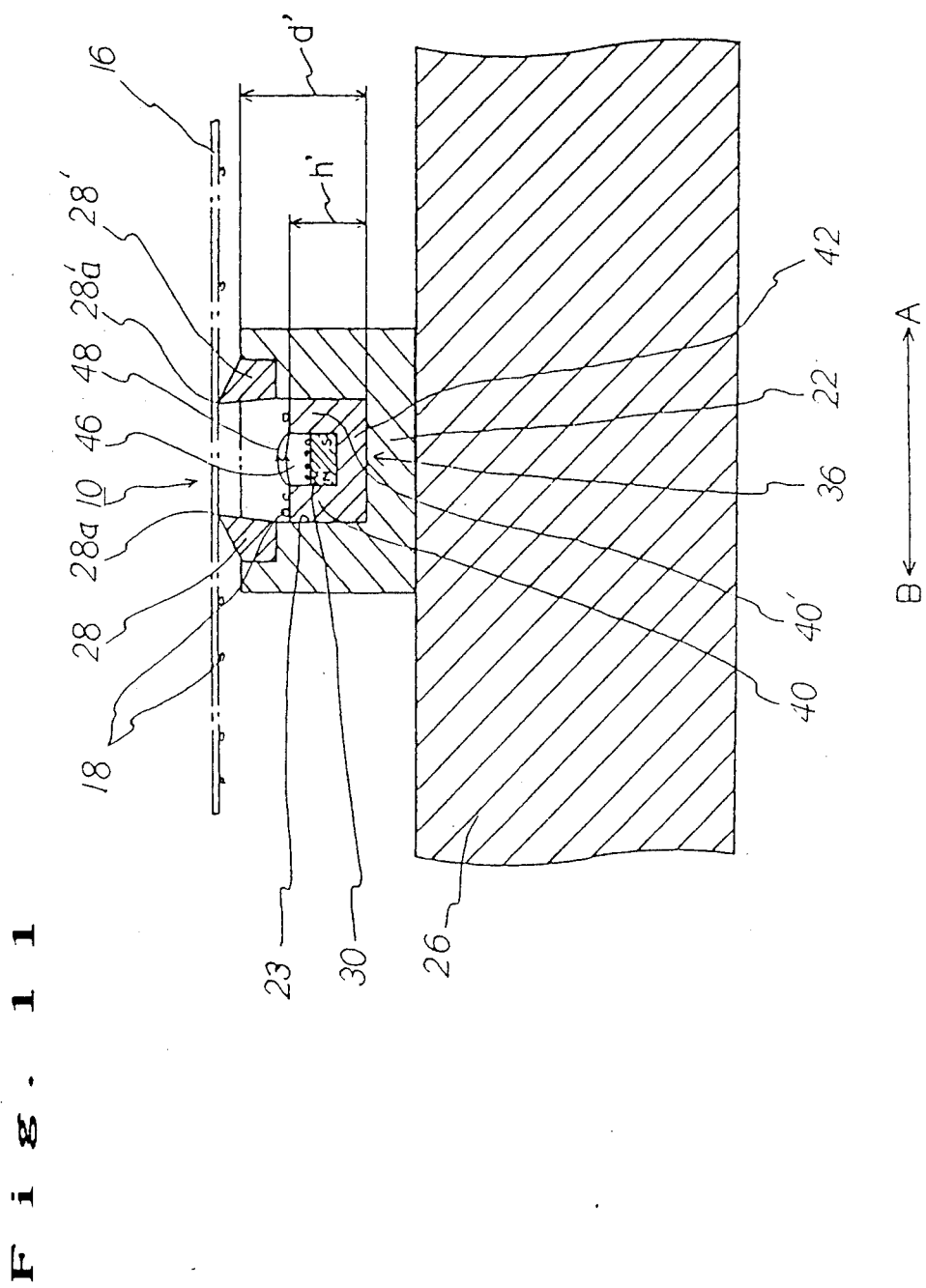
FIG. 11 is a cross-sectional view of the magnetic tape cleaner taken along a line XI—XI of FIG. 9.

FIGS. 10 and 11 show a magnetic tape cleaner 10 constructed in a manner substantially identical to that of FIGS. 6 through 8, but so constructed that it is suitably used for a vertical type magnetic instrument. The same numerals designate the same components. In the magnetic tape cleaner 10 of FIGS. 10 and 11, the scraper body 22 is mounted on the base 26 so that the opening 22a faces upwardly and is secured by the screws 24 and 24' thereto. The yoke member 36 together with the magnet 30 is positioned within the space 23 of the scraper body 22 and held by the front and rear covers 34 and 34' indicated by two dot-dash lines in FIG. 10 and detachably secured to the scraper body 22 by the screws 35 and screws 35'. Thus, it will be noted that the yoke member 36 and the magnet 30 can be withdrawn by detaching the cover 34 or 34' from the scraper body 22. It will be noted that the height h' of the yoke member 36 is set so as to be less than the depth d' of the space 23 of the scraper body 22 in the same manner as that of the cleaner of FIGS. 6 through 8 and that the yoke member 36 is not required to have the mounting portion. The connecting portion 42 may be of magnetic material, but preferably of material having low permeability, because this causes the magnetic flux to be more collected at the magnetic gap 46.

The magnetic powder 18 on the recording face of the magnetic tape 16 is scraped by either of the scraper blades 28 and 28' in accordance with the tape running direction and the loose powder is attracted and adhered to the pole pieces 40 and 40' of the yoke member 36 and the upper face of the magnet 30. The magnetic powder 18 can be removed from the yoke member 36 together with the magnet 30 by detaching the cover 34 or 34' as aforementioned.

Figure 13:
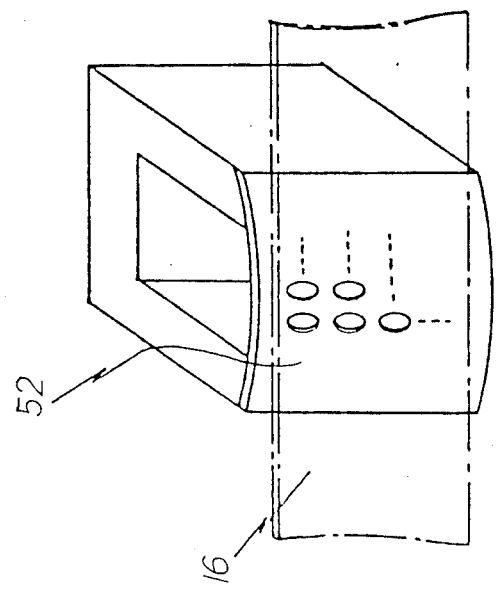
FIGS. 12 and 13 illustrates two different modified tape scrapers which may be used for the invention.
Figure 12:
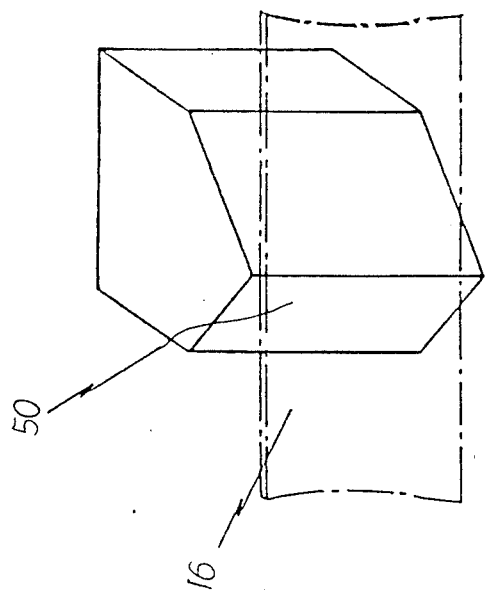
Figure 14:
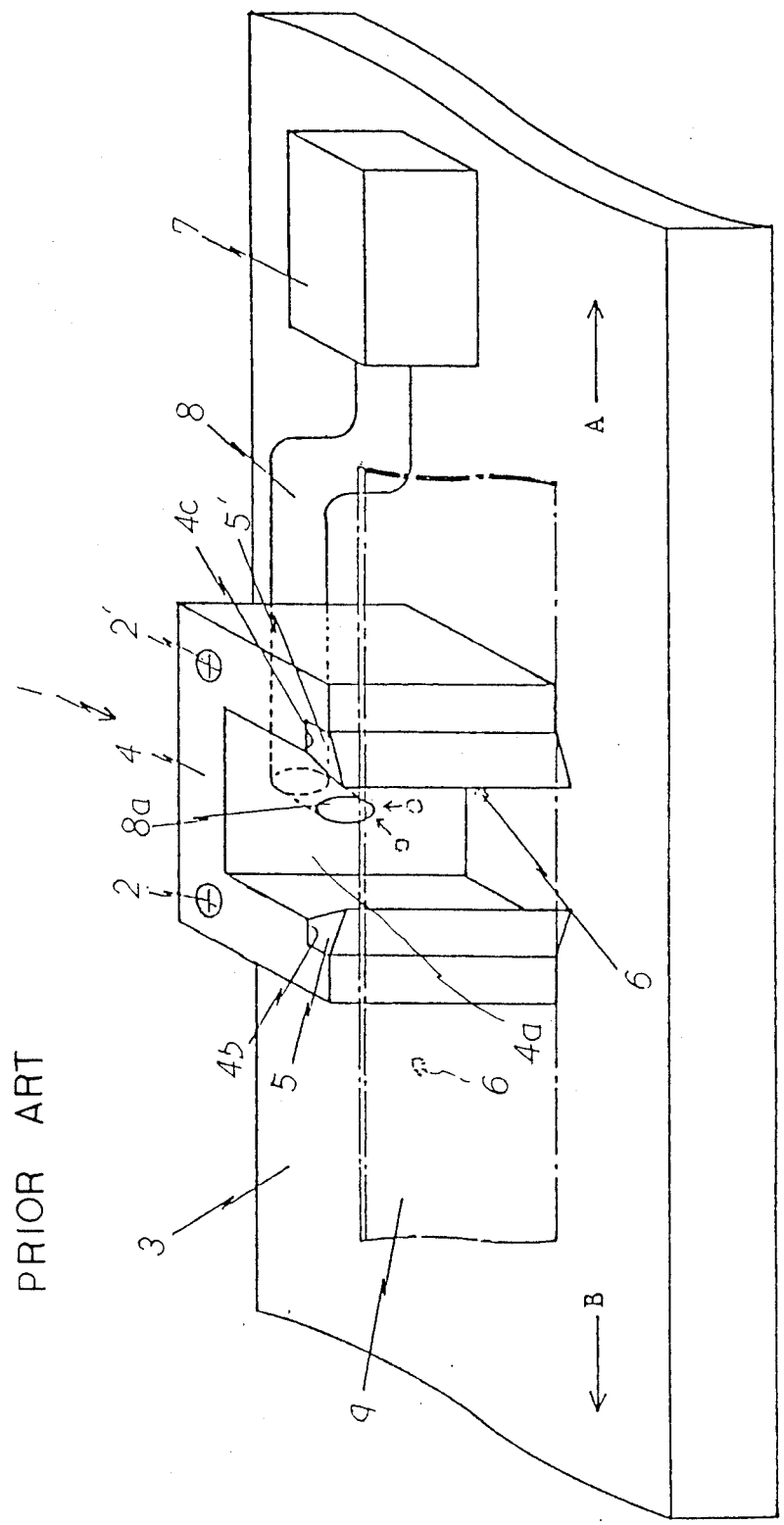
FIG. 14 is a perspective view of a prior art magnetic tape cleaner.

In the embodiments of FIGS. 1 through 11, although the tape scraper 20 comprises the pair of scraper blades 28 and 28', it may comprise a single scraper blade 50 as shown in FIG. 12 or a perforated plate 52 as shown in FIG. 13. It should also be noted that the magnet 30 should be disposed far enough away from the magnetic tape 16 so that the magnetic flux from the magnet 30 has no adverse effect on the magnetic tape 16, as is well known in the art.

Although some embodiments of the invention have been illustrated and described with reference to the accompanying drawings, it will be understood by those skilled in the art that they are by way of examples, and that various changes and modifications may be made without departing from the spirit and scope of the invention, which is intended to be defined only by the appended claims.

What is claimed is:
1. A magnetic tape cleaner comprising:
   tape scraper means engaging a magnetic tape to scrape magnetic powder from a recording face of said magnetic tape;
   and magnetic means disposed relatively below said scraper in a direction in which said scraped magnetic powder falls to attract and adhere said scraped powder thereto.
2. A magnetic tape cleaner as set forth in claim 1, and wherein said magnet means comprises a magnet.
3. A magnetic tape cleaner as set forth in claim 1, and wherein said magnet means is disposed in a containing hole provided in a base in alignment with a space of said tape scraper means.
4. A magnetic tape cleaner as set forth in claim 1, and wherein said magnet means is disposed in a space of said tape scraper means.
5. A magnetic tape cleaner as set forth in claim 1, and wherein said magnet means comprises a combination of a magnet and a yoke member magnetically connected to said magnet and including a pair of pole pieces having a gap provided therebetween.
6. A magnetic tape cleaner as set forth in claim 5, and wherein said yoke member comprises a connecting portion connecting said pair of pole pieces.
7. A magnetic tape cleaner as set forth in claim 6, and wherein said connecting portion of said yoke member is of magnetic material.
8. A magnetic tape cleaner as set forth in claim 6, and wherein said connecting portion of said yoke member is of material having low permeability.

* * * * *